US011175978B2

(12) United States Patent
Shapiro

(10) Patent No.: US 11,175,978 B2
(45) Date of Patent: Nov. 16, 2021

(54) DETECTION OF AN ERROR GENERATED WITHIN AN ELECTRONIC DEVICE

(71) Applicant: INTERNATIONAL BUSINESS MACHINES CORPORATION, Armonk, NY (US)

(72) Inventor: Michael Shapiro, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 151 days.

(21) Appl. No.: 16/528,289

(22) Filed: Jul. 31, 2019

(65) Prior Publication Data
US 2021/0034453 A1 Feb. 4, 2021

(51) Int. Cl.
*G06F 11/07* (2006.01)
(52) U.S. Cl.
CPC ...... *G06F 11/0793* (2013.01); *G06F 11/0751* (2013.01)
(58) Field of Classification Search
CPC .................. G06F 11/0793; G06F 11/0751
See application file for complete search history.

(56) References Cited

U.S. PATENT DOCUMENTS

| | | | | |
|---|---|---|---|---|
| 4,453,213 A * | 6/1984 | Romagosa | .......... | G06F 11/0745 714/30 |
| 5,428,629 A * | 6/1995 | Gutman | ................ | H04L 1/0057 714/758 |
| 5,841,982 A * | 11/1998 | Brouwer | ................. | H04L 51/30 709/224 |
| 6,601,210 B1 * | 7/2003 | Kagan | ................... | H04L 1/0061 714/758 |
| 6,662,319 B1 * | 12/2003 | Webb, Jr. | ............ | G06F 11/0763 714/52 |
| 7,590,701 B2 | 9/2009 | Panec et al. | | |
| 7,925,931 B1 * | 4/2011 | Smith | ................. | G06F 11/0793 714/43 |
| 8,296,401 B2 * | 10/2012 | Bilkhu | ................... | G06Q 10/10 709/220 |
| 9,634,859 B2 | 4/2017 | Brunnberg et al. | | |

(Continued)

FOREIGN PATENT DOCUMENTS

WO WO-2016048283 A1 * 3/2016 ........... G06F 40/205

*Primary Examiner* — Matthew M Kim
*Assistant Examiner* — Indranil Chowdhury
(74) *Attorney, Agent, or Firm* — Brian F. Russell; Stosch Sabo

(57) ABSTRACT

An error in content generated by a first electronic device can be detected by a second electronic device. The second electronic device receives, in one or more messages, first message content and second message content generated by integrated circuit logic within the first electronic device. The second electronic device compares the first message content with predetermined message content. Based on detecting a mismatch between the first message content and the predetermined message content, the second electronic device initiates error recovery for the one or more messages. Initiating error recovery can include, for example, logging an error in the integrated circuit logic, requesting for the first electronic device to regenerate the first message content and second message content, or initiating execution of a program that detects and corrects programming errors in the integrated circuit logic.

20 Claims, 4 Drawing Sheets

(56) References Cited

U.S. PATENT DOCUMENTS

| | | | | |
|---|---|---|---|---|
| 2001/0029592 | A1* | 10/2001 | Walker | G11C 29/52 |
| | | | | 714/42 |
| 2001/0044917 | A1* | 11/2001 | Lester | G11C 29/52 |
| | | | | 714/718 |
| 2001/0047497 | A1* | 11/2001 | Larson | G06F 11/106 |
| | | | | 714/42 |
| 2002/0046365 | A1* | 4/2002 | Avizienis | G06F 11/2028 |
| | | | | 714/43 |
| 2007/0250750 | A1* | 10/2007 | Pourbigharaz | G06F 11/0751 |
| | | | | 714/746 |
| 2008/0016249 | A1* | 1/2008 | Ellis | G06F 9/52 |
| | | | | 709/248 |
| 2011/0252268 | A1* | 10/2011 | Avizienis | G06F 11/0793 |
| | | | | 714/2 |
| 2012/0166879 | A1* | 6/2012 | Watanabe | G06F 11/0751 |
| | | | | 714/37 |
| 2014/0258776 | A1* | 9/2014 | Poledna | G06F 11/0721 |
| | | | | 714/11 |
| 2015/0347218 | A1* | 12/2015 | Domingues | G06F 11/0772 |
| | | | | 714/57 |
| 2016/0196194 | A1* | 7/2016 | Shih | G06F 11/3027 |
| | | | | 714/43 |
| 2020/0117534 | A1* | 4/2020 | Yurzola | G06F 3/0683 |
| 2020/0125436 | A1* | 4/2020 | Sudhaus | F02D 41/2403 |
| 2021/0011800 | A1* | 1/2021 | Chen | G06F 3/0619 |
| 2021/0173588 | A1* | 6/2021 | Kannan | G06F 3/0634 |

* cited by examiner

DETECTION OF AN ERROR GENERATED WITHIN AN ELECTRONIC DEVICE

BACKGROUND OF THE INVENTION

This disclosure relates to electronic devices, such as integrated circuits, and more particularly, to the detection of errors generated within electronic devices.

Computer systems typically include a large amount of both nonvolatile data storage (e.g., Hard Disk Drives (HDD) or Solid State Drives (SSDs)) and volatile data storage (e.g., Random Access Memory (RAM)) to hold operating system software, application programs, and other data. In addition, computer systems include a multiplicity of other integrated circuits (e.g., processors, controllers, adapters, etc.) that access, modify, and store such data. As is well known in the art, data is commonly stored in binary format (1's and 0's), where each individual binary digit is referred to as a "bit" of data. Bits of data are often grouped to form higher level constructs, such as 8-bit "bytes" and 8-byte or 16-byte (or longer) data "words."

The circuits used to store and manipulate voltage levels representing bits and the data storage media used to store the bits are subject to both device failure and state changes due to high energy cosmic rays and alpha particles. Depending on which bit is affected by an error, an error in just a single bit can cause an entire process, an entire partition, or even an entire computer system to fail. When an error occurs, whether a single bit error, multi-bit error, full chip/device failure or full memory module failure, all or part of the computer system may remain down until the error is corrected or repaired. Downtime attributable to individual errors and/or to all errors collectively can have a substantial impact on computer system performance and on a business dependent on the computer system.

The probability of encountering an error during normal computer system operation has increased concomitantly with the increasing capacity of data storage and circuit density in computer systems. Techniques to detect and correct bit errors have evolved into an elaborate science over the past several decades. One of the most basic detection techniques is the use of odd or even parity where the 1's or 0's in a data word are logically combined in a bitwise exclusive-OR (XOR) operation to produce a parity bit. For example; a data word with an even number of 1's will have a parity bit of 0, and a data word with an odd number of 1's will have a parity bit of 1. If a single bit error occurs in the data word, the error can be detected by regenerating parity from the data and then checking to see that the calculated parity matches the originally generated parity stored with the word.

Richard Hamming recognized that this parity technique could be extended to not only detect errors, but also correct errors by appending a more intricate XOR field, referred to as an error correction code (ECC) field, to each code word. The ECC field is a combination of different bits in the code word XOR-ed together so that errors (small changes to the data word) can be easily detected, pinpointed, and corrected. The number of errors that can be detected and corrected in a code word is directly related to the length of the ECC field. The challenge is to ensure a minimum separation distance between valid data words and code word combinations. As the number of errors that can be detected and corrected increases, the ECC field also increases in length, which creates a greater distance between valid code words (i.e., a greater Hamming distance). In current computer systems, memory circuits are commonly protected by ECC that supports Double-bit Error Detection (DED) and Single-bit Error Correction (SEC), which allows the memory circuits to recover from single-bit transient errors caused by alpha particles and cosmic rays. Data transmitted via computer networks and/or stored in non-volatile data storage devices, such as SSDs, are often similarly protected by data protection schemes such as ECC, Cyclic Redundancy Checks (CRCs), and Longitudinal Redundancy Checks (LRCs).

BRIEF SUMMARY

The present disclosure appreciates that prior art error detection and correction techniques generally apply only to stored or transmitted data for which the correct bit values and an associated data protection value (e.g., parity, ECC, CRC, etc.) are known. However, cosmic rays and alpha particles affect not only data while stored or being transmitted, but also affect the circuits that generate and process the data. For example, logic gates within integrated circuits, such as programmable logic arrays (PLAs) and field programmable gate array (FPGA), are also susceptible to a change in function when subjected to cosmic rays and alpha particles. The change in logic gate function can create incorrect bit values that cannot be detected and corrected utilizing conventional error detection and correction techniques, which rely on a priori knowledge of the correct bit values and the associated data protection value.

Accordingly, one or more embodiments are disclosed herein that enable detection, by a second electronic device, of an error in content generated by a first electronic device. The second electronic device receives, in one or more messages, first message content and second message content generated by integrated circuit logic within the first electronic device. The second electronic device compares the first message content with predetermined message content. Based on detecting a mismatch between the first message content and the predetermined message content, the second electronic device initiates error recovery for the one or more messages. Initiating error recovery can include, for example, logging an error in the integrated circuit logic, requesting for the first electronic device to regenerate the first message content and second message content, or initiating execution of a program that detects and corrects programming errors in the integrated circuit logic.

DETAILED DESCRIPTION

Figure 1:
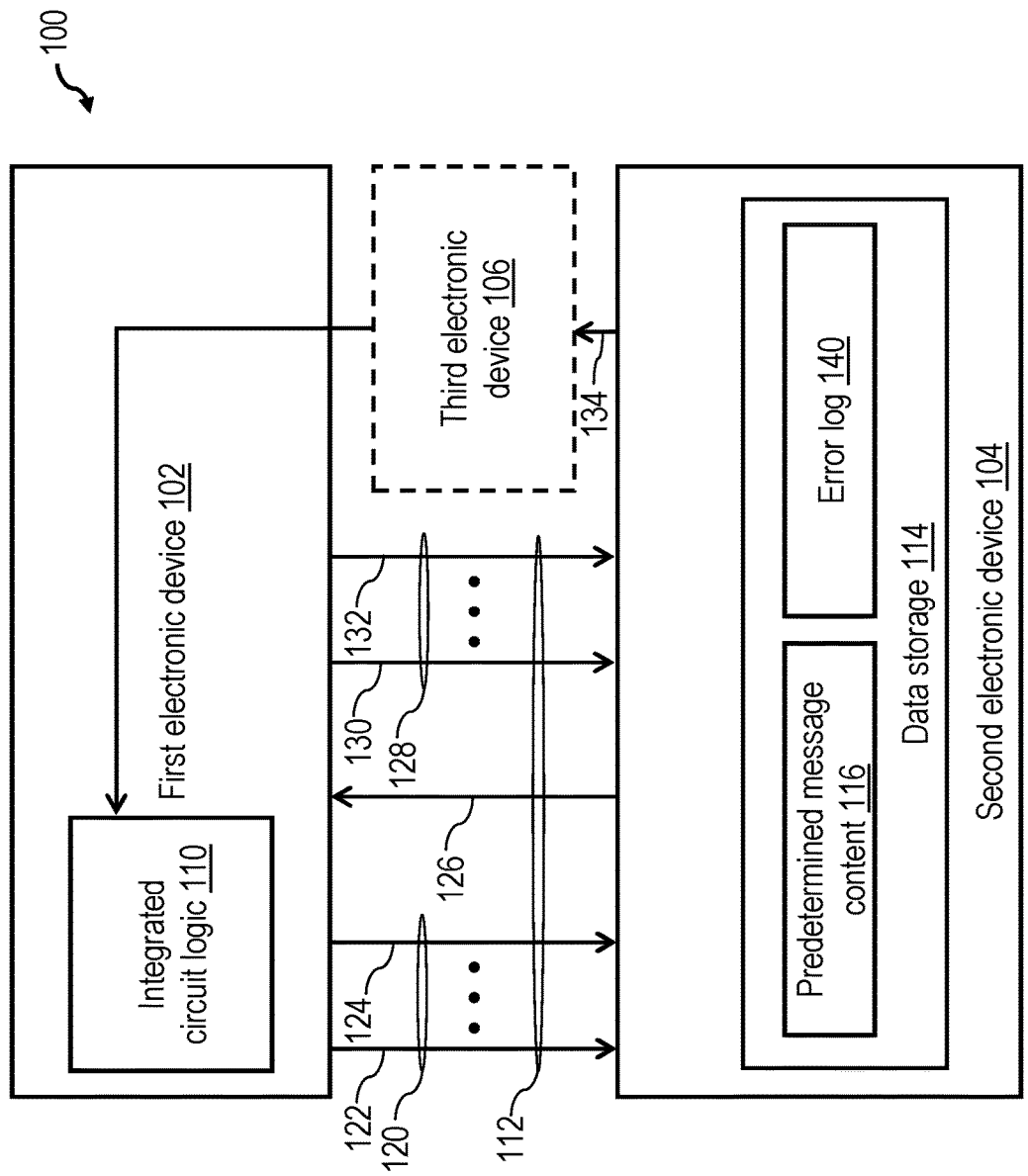
FIG. 1 is a high-level block diagram of a data processing environment in accordance with one embodiment.

With reference to the figures and with particular reference to FIG. 1, there is illustrated a high-level block diagram of a data processing environment 100 in accordance with one or more embodiments. Data processing environment 100 includes at least a first electronic device 102 and a second electronic device 104, and may optionally include one or more additional electronic devices and/or components, such as third electronic device 106. Each of first and second electronic devices 102, 104 includes integrated circuitry, which as appreciated by those skilled in the art includes a multiplicity of individual logic gates providing logic functions, such as AND, OR, NOR, NOT, XOR, etc. In various embodiments, the integrated circuitry within a given electronic device 102 or 104 may be fabricated in a single integrated circuit chip, reside in multiple dies sharing a common chip package, or include a plurality of packaged integrated circuits. In some exemplary embodiments, one or more of first electronic device 102 and/or second electronic device 104 may comprise, for example, a processor, a controller, or the like. In such embodiments, some of the functions of the electronic device can be implemented utilizing program code (e.g., software and/or firmware), as is known in the art.

In the depicted example, first electronic device 102 includes integrated circuit logic 110. In some cases, integrated circuit logic 110 is implemented with non-programmable integrated circuit logic, which is fixed from the time of fabrication. In other cases, integrated circuit logic 110 is implemented with programmable logic and may comprise, for example, a programmable logic array (PLA), field programmable gate array (FPGA), or other programmable logic. In both cases, the logic functions performed by integrated circuit logic 110 are subject to transient or hard (i.e., stuck bit) errors induced, for example, by cosmic rays and/or alpha particles.

First and second electronic devices 102 and 104 are communicatively coupled by a communication channel 112. Communication channel 112 may comprise, for example, a serial or parallel bus, a switched interconnect, an input/output channel, a cable, and/or a network.

In the depicted example, second electronic device 104 includes or is communicatively coupled to data storage 114. Data storage 114 may include, for example, a buffer, cache, memory, or other data storage device. As discussed further below with reference to FIG. 2, data storage 114 stores predetermined message content 116, which can be utilized by second electronic device 104 to detect an error in integrated circuit logic 110 of first electronic device 102. In at least one embodiment, predetermined message content includes a complete set of all of the multi-bit symbols that first electronic device 102 may communicate to second electronic device 104 via communication channel 112. For example, if the set of symbols includes the English alphabet, predetermined message content 116 can comprise an alphabetically ordered concatenation of letters A through Z. Predetermined message content 116 stored in data storage 114 is preferably protected against bit errors, such as those caused by cosmic rays or alpha particles, by one or more possibly conventional data protection schemes, such as parity, ECC, etc.

Figure 2:
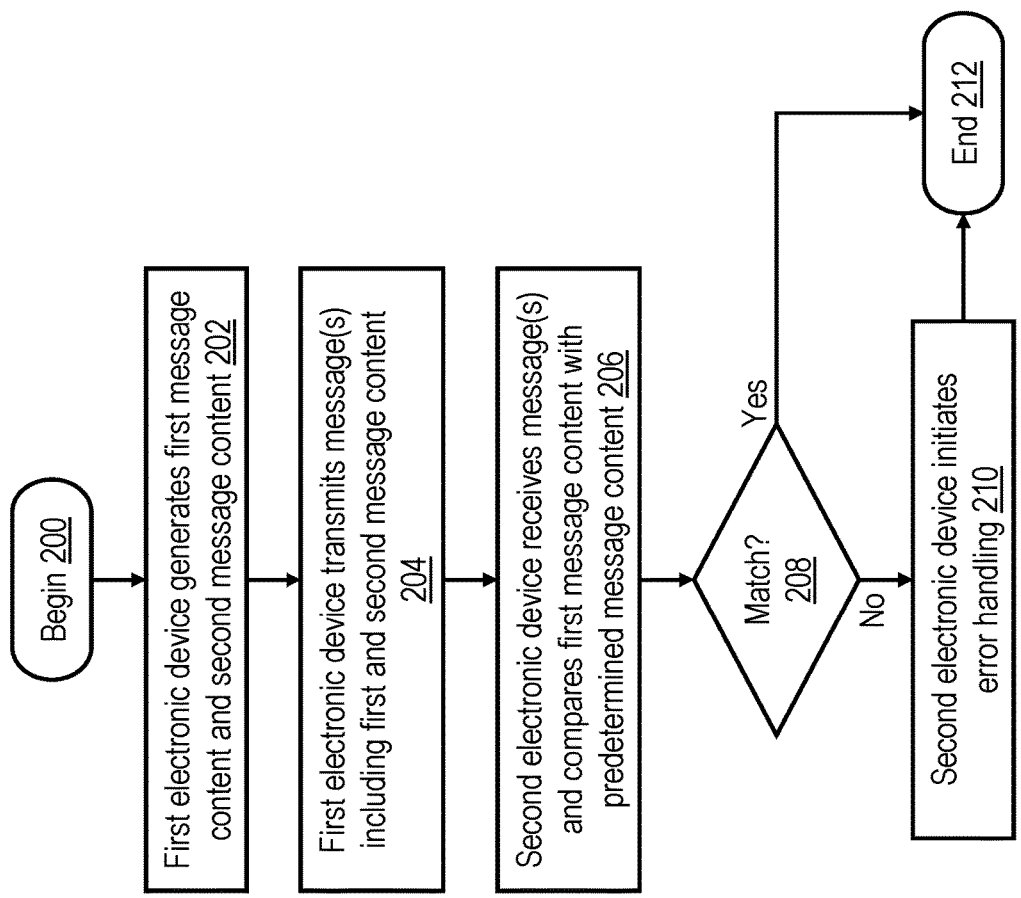
FIG. 2 is a high-level logical flowchart of an exemplary process for detecting an error in the data processing environment of FIG. 1 in accordance with one embodiment.

Referring now to FIG. 2, there is depicted a high-level logical flowchart of an exemplary process for detecting an error in the data processing environment of FIG. 1 in accordance with one embodiment.

The process of FIG. 2 begins at block 200 and proceeds to block 202, which depicts first electronic device 102 generating first message content and second message content. First electronic device 102 preferably generates both the first message content and the second message content utilizing integrated circuit logic 110. In at least one embodiment, the first message content includes a complete set of all of the multi-bit symbols that first electronic device 102 may communicate to second electronic device 104 via communication channel 112. Consequently, the first message content can be utilized to detect errors in the generation of symbols by integrated circuit logic 110. In contrast to the first message content, which may be static, the second message content preferably contains dynamic data, such as processing results, a status report, a control message, etc.

At block 204, first electronic device 102 transmits the first message content 122 and the second message content 124 created at block 202 to second electronic device 104 via communication channel 112 in one or more messages 120. Thus, in some embodiments, first electronic device 102 transmits first message content 122 and second message content 124 in a single message 120. In other embodiments, first electronic device 102 transmits first message content 122 and second message content 124 in multiple messages 120. In some embodiments, first message content 122 is received by second electronic device 104 prior to second message content 124; in other embodiments, second message content 124 is received by second electronic device 104 prior to first message content 122. In yet other embodiments, first message content 122 and second message content 124 can be received by second electronic device 104 at a same time or in a chronologically overlapping manner. In some cases, first electronic device 102 may further protect the transmission of message(s) 120 by including within or appending to message(s) 120 one or more data protection field(s), such as a parity field and/or ECC field. Although such data protection fields cannot be utilized to detect an error within integrated circuit logic 110 or within the first message content 122 or second message content 124 generated by integrated circuit logic 110, such data protection fields can be utilized to detect and/or correct one or more errors occurring during transmission of message(s) 120 via communication channel 112.

At block 206, second electronic device 104 receives message(s) 120 via communication channel 112. If data protection field(s) are applied to message(s) 120, second electronic device 104 utilizes such data protection field(s) to detect and correct any transmission errors in message(s) 120. Following any such detection and/or correction of transmission errors, second electronic device 104 compares first message content 122 with predetermined message content 116, for example, utilizing one or more comparators or compare operations.

At block 208, second electronic device 104 detects whether or not first message content 122 of message(s) 120 matches predetermined message content 116. If so, no error is detected by second electronic device 104 in integrated circuit logic 110 of first electronic device 102, and the process of FIG. 2 ends at block 212. If, however, second electronic device 104 detects a mismatch between first message content 122 of message(s) 120 and predetermined message content 116, second electronic device 104 treats both first message content 122 and second message content 124 as containing errors and initiates error handling (block 210). Until error handling is complete, second electronic device 104 preferably does not utilize any second message content received from first electronic device 102 for any processing that relies on the correctness of the second message content.

In various implementations, the error handling initiated by second electronic device 104 at block 210 may include various different activities. For example, in some embodiments, the error handling initiated by second electronic device 104 may include, for example, recording within an error log 140 in data storage 114 the existence of the error, and in some embodiments, the location of the error within first message content 122. In some embodiments, the error handling may include second electronic device 104 transmitting an error (retry) notification 126 to first electronic device 102 via communication channel 112. In some embodiments, error notification 126 causes integrated circuit logic 110 of first electronic device 102 to regenerate the first message content and second message content, which can again be transmitted to second electronic device 104 in one or more message(s) 128 as first message content 130 and second message content 132. If second electronic device 104 determines that first message content 130 matches predetermined message content 116, then the error was transient, second message content 132 is handled as containing correct data, and regular processing of message can resume.

If, however, second electronic device 104 detects a continuing mismatch between the retransmission of the first message content (i.e., first message content 130) and predetermined message content 116, second electronic device 104 treats the error as non-transient, and preferably escalates its error handling. For example, in embodiments in which integrated circuit logic 110 is implemented utilizing programmable logic, second electronic device 104 may issue a reprogramming request 134. As explicitly shown in FIG. 1, reprogramming request 134 can cause second electronic device 104 (or an optional third electronic device 106) to reprogram the programmable logic within integrated circuit logic 110 in an attempt to correct the observed error at its source. Following block 210, the process of FIG. 2 ends at block 212.

Figure 3:
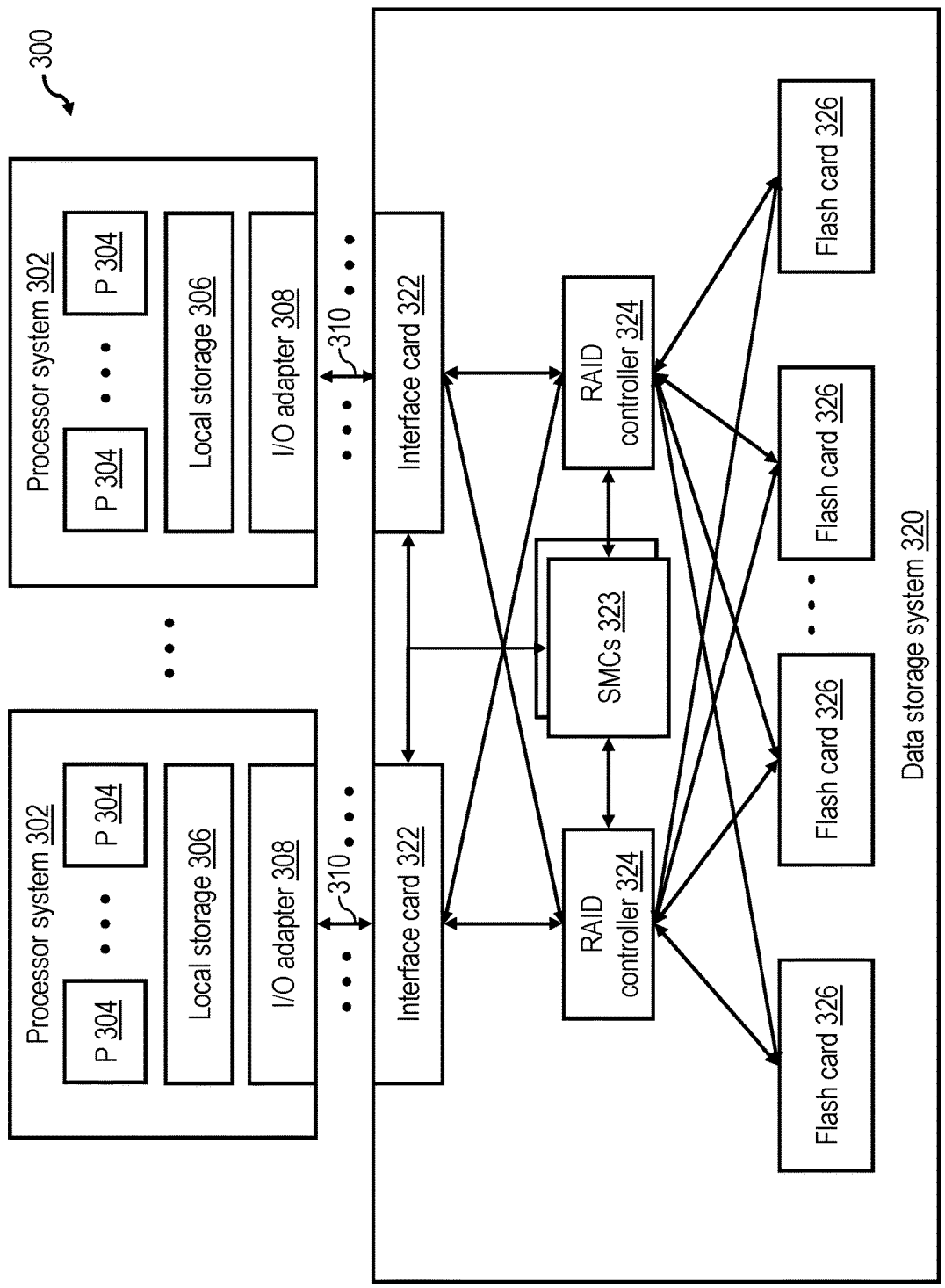
FIGS. 3-4 provide a more detailed block diagram of an example of a data processing system environment in which the disclosed error detection technique can be applied.
Figure 4:
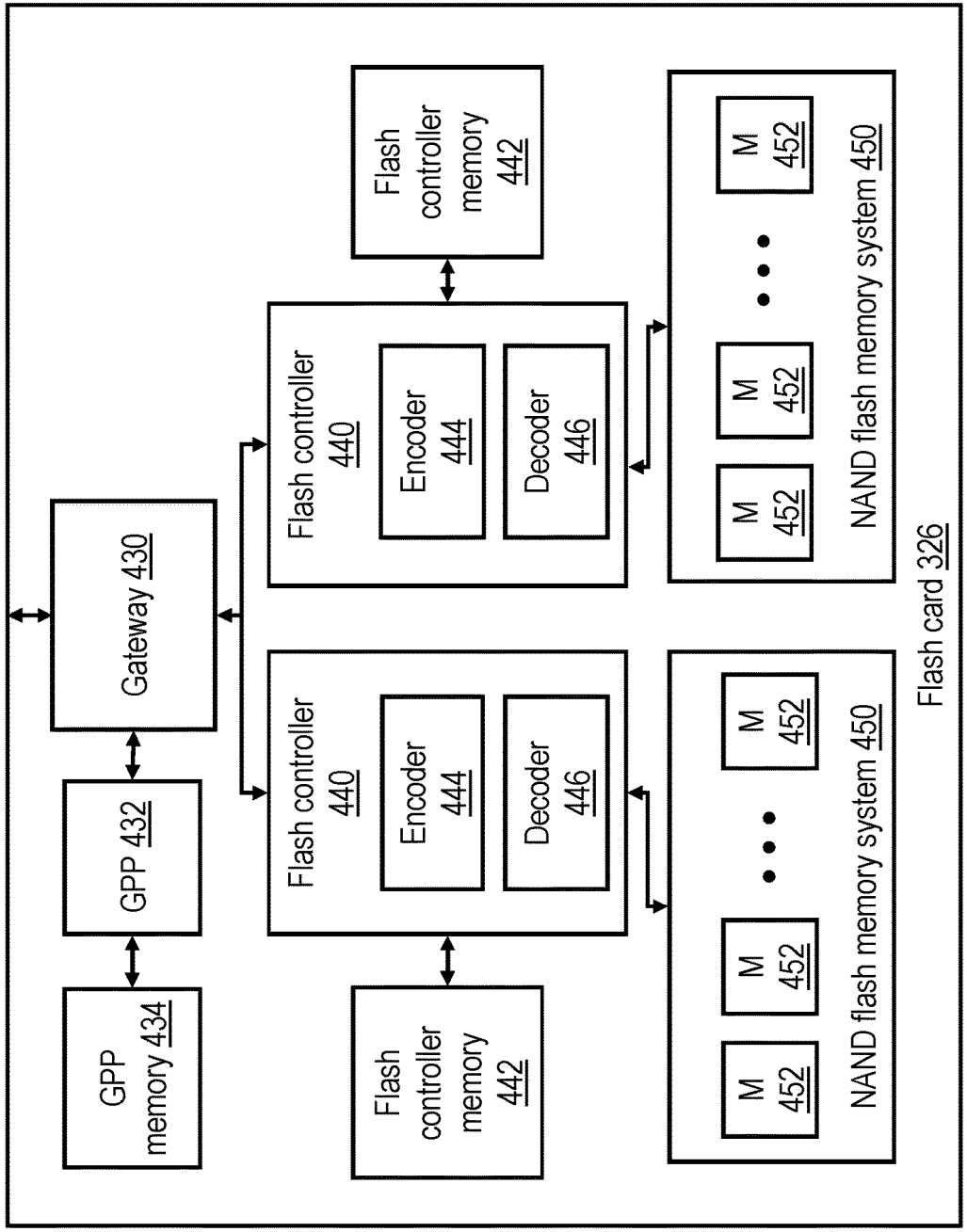

Referring now to FIGS. 3-4, there are depicted more detailed block diagrams of one exemplary implementation of a data processing environment, such as data processing environment 100 of FIG. 1. As shown in FIG. 3, a data processing environment 300 includes one or more hosts, such as a processor system 302 having one or more processors 304 that process instructions and data. A processor system 302 may additionally include local storage 306 (e.g., dynamic random access memory (DRAM) or disks) that may store program code, operands and/or execution results of the processing performed by processor(s) 304. In various embodiments, a processor system 302 can be, for example, a mobile computing device (such as a smartphone or tablet), a laptop or desktop personal computer system, a server computer system (such as one of the POWER series of servers available from International Business Machines Corporation), or a mainframe computer system. A processor system 302 can also be an embedded processor system using various processors such as ARM, POWER, Intel X86, or any other processor combined with any of memory caches, memory controllers, local storage, I/O bus hubs, etc.

Each processor system 302 further includes an input/output (I/O) adapter 308 that is coupled directly (i.e., without any intervening device) or indirectly (i.e., through at least one intermediate device) to a data storage system 320 via an I/O channel 310. In various embodiments, I/O channel 310 may employ any one or a combination of known or future developed communication protocols, including, for example, Fibre Channel (FC), FC over Ethernet (FCoE), Internet Small Computer System Interface (iSCSI), Infini-Band, Transport Control Protocol/Internet Protocol (TCP/IP), Peripheral Component Interconnect Express (PCIe), etc. I/O requests communicated via I/O channel 310 include read requests by which a processor system 302 requests data from data storage system 320 and write requests by which a processor system 302 requests storage of data in data storage system 320.

Although not required, in the illustrated embodiment, data storage system 320 includes multiple interface cards 322 through which data storage system 320 receives and responds to I/O requests of hosts via I/O channels 310. Each interface card 322 is coupled to each of multiple Redundant Array of Inexpensive Disks (RAID) controllers 324 in order to facilitate fault tolerance and load balancing. Each of RAID controllers 324 is in turn coupled (e.g., by a PCIe bus) to non-volatile storage media, which in the illustrated example include multiple flash cards 326 bearing NAND flash memory. In other embodiments, alternative and/or additional non-volatile storage devices can be employed.

In the depicted embodiment, the operation of data storage system 320 is managed by redundant system management controllers (SMCs) 323, which are coupled to interface cards 322 and RAID controllers 324. In various embodiments, system management controller 323 can be implemented utilizing hardware or hardware executing program code (e.g., firmware and/or software).

FIG. 4 depicts a more detailed block diagram of an exemplary embodiment of a flash card 326 of data storage system 320 of FIG. 3. Flash card 326 includes a gateway 430 that serves as an interface between flash card 326 and RAID controllers 324. Gateway 430 is coupled to a general-purpose processor (GPP) 432, which can be configured (e.g., by program code) to perform pre-processing on I/O requests received by gateway 430 and/or to schedule servicing of the I/O requests by flash card 326. GPP 432 is coupled to a GPP memory 434 (e.g., Dynamic Random Access Memory (DRAM)) that can conveniently buffer data created, referenced and/or modified by GPP 432 in the course of its processing or data flowing through the gateway 430 destined for one or more of the flash controllers 440.

Gateway 430 is further coupled to multiple flash controllers 440, each of which controls a respective NAND flash memory system 450. Flash controllers 440 can be implemented, for example, by an Application Specific Integrated Circuit (ASIC) and/or a Field Programmable Gate Array (FPGA) and/or a microprocessor, and each have an associated flash controller memory 442 (e.g., DRAM). In embodiments in which flash controllers 440 are implemented with an FPGA, GPP 432 may program and configure flash controllers 440 during start-up of data storage system 320. After startup, in general operation flash controllers 440 receive read and write requests from gateway 430 that request to read data stored in NAND flash memory system 450 and/or to store data in NAND flash memory system 450. Flash controllers 440 service these requests, for example, by accessing NAND flash memory system 450 to read or write the requested data from or into NAND flash memory system 450 or by accessing a memory cache (not illustrated) associated with NAND flash memory system 450.

Flash controllers 440 implement a flash translation layer (FTL) that provides logical-to-physical address translation to enable access to specific memory locations within NAND flash memory systems 450. In general, an I/O request received by a flash controller 440 from a host device, such as a processor system 302, contains the logical block address (LBA) at which the data is to be accessed (read or written) and, if a write request, the write data to be stored to data storage system 320. The I/O request may also specify the amount (or size) of the data to be accessed. Other information may also be communicated depending on the protocol and features supported by data storage system 320. The flash translation layer translates LBAs received from a RAID controller 324 into physical addresses assigned to corresponding physical location in NAND flash memory systems 450. Flash controllers 440 may perform address translation and/or store mappings between logical and physical addresses in a logical-to-physical translation data structure, such as a logical-to-physical translation table (LPT), which may conveniently be stored in flash controller memory 442.

NAND flash memory systems 450 may take many forms in various embodiments. In the embodiment shown in FIG. 4, each NAND flash memory system 450 includes multiple (e.g., 32) individually addressable NAND flash memory storage devices 452. In the illustrated example, the flash memory storage devices 452 take the form of a board-mounted flash memory modules, for example, Single Level Cell (SLC), Multi-Level Cell (MLC), Three Level Cell (TLC), or Quad Level Cell (QLC) NAND flash memory modules. The fidelity of data read from flash memory storage devices 452 is preferably enhanced through the implementation of ECC encoding, for example, by flash controllers 440 and/or high level controllers, such as GPPs 432 or RAID controllers 324. In the illustrated embodiment, ECC encoding and decoding is implemented at least in flash controllers 440 by an encoder 444 and decoder 446.

In at least some embodiments of data processing environment 300, components containing programmable logic, such as flash controllers 440, transmit messages to other components, for example, to communicate status and control information. As described above, because the message content is generated (i.e., created) by the programmable logic, the integrity of the message content cannot be checked utilizing conventional data protection (e.g., parity, CRC, and/or ECC) techniques. Status or control messages containing erroneous content can cause unexpected system behavior and/or possible system outages.

For example, consider an exemplary status reporting message containing the following message content:
Card Part Number: 00DH310
Card BRU Number: 00DJ344
Card Serial Number: 53912F
Board Serial Prefix: YS63BG
Board Manufacture Date: 1115

This message content may be generated, for example, by a flash controller 440 and transmitted to a higher level controller, such as a RAID controller 324 or SMC 323, or to a management console, for example, implemented utilizing one of processor systems 302. Of course, in other embodiments, the message content may include multi-bit symbols in in addition to or other than alphabetic or human-readable symbols (e.g., binary-coded decimal (BCD), hexadecimal, Unicode, etc.).

As discussed above, creation of this status reporting message may be subject to error, for example, due to the effects on the programmable logic within flash controller 440 of cosmic rays and/or alpha particles. For example, cosmic rays and/or alpha particles may cause the programmable logic gates to incorrectly generate a "J" rather than an "N", to substitute an apostrophe (i.e., "'") in place of a "d", and to generate a "b" instead of an "f". These and other similar character errors can cause the exemplary status reporting message above to be created as:
Card Part Jumbar: 00DH344
Card BRU Jumbar: 00DJ363
Car' Serial Jumbar: 53912F
Boar' Serial Prebix: YS63BG
Boar' Majufactura Dape: 1115

In order to detect these types of symbol errors, flash controller 440 may transmit first message content, which can include, for example, the concatenation, in a predetermined order, of all of the possible multi-bit symbols that can be transmitted to a second electronic device. Thus, in this case, the first message content may be, for example, the ordered text string:

abcdefghijklmnopqrstuvwxyz1234567890!@#$%^&*()>.,

If this text string is not correctly received by the second electronic device (e.g., RAID controller 324, SMC 323, or management console) in association with the status reporting message, the second electronic device can initiate error handling, as described above with reference to FIG. 2. If the error(s) repeat when the status reporting message is retransmitted, the second electronic device (e.g., RAID controller 324, SMC 323, or management console) may escalate error handling by causing flash controller 440 to be reprogrammed, for example, by issuing the appropriate control command to the associated GPP 432.

As has been described, in at least one embodiment, an error in content generated by a first electronic device can be detected by a second electronic device. The second electronic device receives, in one or more messages, first message content and second message content generated by integrated circuit logic within the first electronic device. The second electronic device compares the first message content with predetermined message content. Based on detecting a mismatch between the first message content and the predetermined message content, the second electronic device initiates error recovery for the one or more messages. Initiating error recovery can include, for example, logging an error in the integrated circuit logic, requesting for the first electronic device to regenerate the first message content and second message content, or initiating execution of a program that detects and corrects programming errors in the integrated circuit logic.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the present invention has been particularly shown as described with reference to one or more preferred embodiments, it will be understood by those skilled in the art that various changes in form and detail may be made therein without departing from the spirit and scope of the invention. For example, although aspects have been described with respect to a data storage system including a flash controller that directs certain functions, it should be understood that present invention may alternatively be implemented as a program product including a storage device storing program code that can be processed by a processor to perform such functions or cause such functions to be performed. As employed herein, a "storage device" is specifically defined to include only statutory articles of manufacture and to exclude signal media per se, transitory propagating signals per se, and energy per se.

In addition, although embodiments have been described that include use of a NAND flash memory, it should be appreciated that embodiments of the present invention can also be used with any other type of non-volatile random access memory (NVRAM).

The figures described above and the written description of specific structures and functions below are not presented to limit the scope of what Applicants have invented or the scope of the appended claims. Rather, the figures and written description are provided to teach any person skilled in the art to make and use the inventions for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present inventions will require numerous implementation-specific decisions to achieve the developer's ultimate goal for the commercial embodiment. Such implementation-specific decisions may include, and likely are not limited to, compliance with system-related, business-related, government-related and other constraints, which may vary by specific implementation, location and from time to time. While a developer's efforts might be complex and time-consuming in an absolute sense, such efforts would be, nevertheless, a routine undertaking for those of skill in this art having benefit of this disclosure. It must be understood that the inventions disclosed and taught herein are susceptible to numerous and various modifications and alternative forms. Lastly, the use of a singular term, such as, but not limited to, "a" is not intended as limiting of the number of items.

What is claimed is:

1. A method of detection of an error in content generated by an electronic device, the method comprising:
   a second electronic device receiving, in one or more messages, first message content and second message content generated by integrated circuit logic within a first electronic device, wherein the integrated circuit logic includes programmable integrated circuit logic containing a plurality of programmable logic gates each implementing a respective one of a plurality of Boolean logic functions;
   the second electronic device comparing the first message content with predetermined message content;
   based on detecting a mismatch between the first message content and the predetermined message content, the second electronic device initiating error recovery for the one or more messages, wherein initiating error recovery includes initiating reprogramming of the plurality of programmable logic gates in the programmable integrated circuit logic; and
   based on not detecting a mismatch between the first message content and the predetermined message content, the second electronic device performing processing based on the second message content.

2. The method of claim 1, wherein the first message content comprises a complete set of multi-bit symbols communicated between the first and second electronic devices.

3. The method of claim 1, wherein initiating error recovery includes transmitting a request for the first electronic device to regenerate the first message content and second message content.

4. The method of claim 1, wherein initiating error recovery includes logging occurrence of an error in the integrated circuit logic of the first electronic device.

5. The method of claim 1, wherein the receiving includes the second electronic device receiving the first message content and the second message content in a single message.

6. The method of claim 1, wherein:
   the first electronic device is a memory controller; and
   initiating reprogramming includes initiating reprogramming of the memory controller by a general-purpose processor.

7. An electronic device for detecting an error in content generated by another electronic device, the electronic device including circuitry configured to:
   receive, in one or more messages, first message content and second message content generated by integrated circuit logic within the electronic device, wherein the integrated circuit logic includes programmable integrated circuit logic containing a plurality of programmable logic gates each implementing a respective one of a plurality of Boolean logic functions;
   compare the first message content with predetermined message content;
   based on detecting a mismatch between the first message content and the predetermined message content, initiate error recovery for the one or more messages by initiating error recovery includes initiating reprogramming of the plurality of programmable logic gates in the programmable integrated circuit logic; and
   based on not detecting a mismatch between the first message content and the predetermined message content, perform processing based on the second message content.

8. The electronic device of claim 7, wherein the first message content comprises a complete set of multi-bit symbols communicated between the electronic device and said another electronic device.

9. The electronic device of claim 7, wherein the integrated circuitry of the electronic device is configured to initiate error recovery by transmitting a request for said another electronic device to regenerate the first message content and second message content.

10. The electronic device of claim 7, wherein the integrated circuitry of the electronic device is configured to log occurrence of an error in the integrated circuit logic of said another electronic device.

11. The electronic device of claim 7, wherein the receiving includes the electronic device receiving the first message content and the second message content in a single message.

12. A data processing system, comprising:
    the electronic device of claim 7; and
    said another electronic device communicatively coupled to the electronic device by a communication channel.

13. The data processing system of claim 12, wherein said another electronic device comprises a controller of a non-volatile memory system.

14. The electronic device of claim 7, wherein:
    the electronic device is a memory controller; and
    initiating reprogramming includes initiating reprogramming of the memory controller by a general-purpose processor.

15. A program product for detecting of an error in content generated by an electronic device, the program product comprising:
    a storage device; and
    program code stored in the storage device that, when executed by a processor, causes the processor to perform:
       receiving, in one or more messages, first message content and second message content generated by integrated circuit logic within the electronic device, wherein the integrated circuit logic includes programmable integrated circuit logic containing a plurality of programmable logic gates each implementing a respective one of a plurality of Boolean logic functions;
       comparing the first message content with predetermined message content; and
       based on detecting a mismatch between the first message content and the predetermined message content, initiating error recovery for the one or more messages by initiating error recovery includes initiating reprogramming of the plurality of programmable logic gates in the programmable integrated circuit logic; and
       based on not detecting a mismatch between the first message content and the predetermined message content, performing processing based on the second message content.

16. The program product of claim 15, wherein the first message content comprises a complete set of multi-bit symbols communicated by the electronic device.

17. The program product of claim 15, wherein initiating error recovery includes transmitting a request for the electronic device to regenerate the first message content and second message content.

18. The program product of claim 15, wherein initiating error recovery includes logging occurrence of an error in the integrated circuit logic of the electronic device.

19. The program product of claim 15, wherein the receiving includes receiving the first message content and the second message content in a single message.

20. The program product of claim 15, wherein:
the electronic device is a memory controller; and
initiating reprogramming includes initiating reprogramming of the memory controller by a general-purpose processor.

\* \* \* \* \*